United States Patent
Matsuura et al.

(10) Patent No.: US 9,425,694 B2
(45) Date of Patent: Aug. 23, 2016

(54) CURRENT RESONANCE TYPE DC-DC CONVERTER AND METHOD FOR OPERATING CURRENT RESONANCE TYPE DC-DC CONVERTER

(71) Applicant: TDK Corporation, Minato-ku, Tokyo (JP)

(72) Inventors: Ken Matsuura, Tokyo (JP); Hiroshige Yanagi, Tokyo (JP)

(73) Assignee: TDK Corporation (JP)

(*) Notice: Subject to any disclaimer, the term of this patent is extended or adjusted under 35 U.S.C. 154(b) by 153 days.

(21) Appl. No.: 13/933,566

(22) Filed: Jul. 2, 2013

(65) Prior Publication Data

US 2014/0009968 A1 Jan. 9, 2014

(30) Foreign Application Priority Data

Jul. 3, 2012 (JP) ................................. 2012-149370

(51) Int. Cl.
*H02M 7/5387* (2007.01)
*H02M 3/335* (2006.01)
*H02M 1/00* (2006.01)

(52) U.S. Cl.
CPC ..... *H02M 3/33507* (2013.01); *H02M 3/33592* (2013.01); *H02M 2001/0058* (2013.01); *Y02B 70/1433* (2013.01); *Y02B 70/1475* (2013.01); *Y02B 70/1491* (2013.01)

(58) Field of Classification Search
CPC ............. H02M 3/28; H02M 3/33507; H02M 3/33569; H02M 3/33561; H02M 3/156; H02M 3/33592; H02M 3/337; H02M 3/3376; H02M 3/335; H02M 3/33538; H02M 3/33523; H02M 3/3385; H02M 3/33515; H02M 3/33576; H02M 3/1563; H02M 3/3378; Y02B 70/1433; Y02B 70/1475; Y02B 70/1491

USPC ............. 363/15–17, 20, 21.01–21.03, 363/21.12–21.15, 21.17–21.18, 24–26, 363/76–81, 95, 97–98, 123, 125–127, 363/131–134

See application file for complete search history.

(56) References Cited

U.S. PATENT DOCUMENTS

| 5,805,432 A * | 9/1998 | Zaitsu et al. ................... 363/16 |
| 2007/0070655 A1* | 3/2007 | Eguchi et al. .................. 363/17 |
| 2009/0034299 A1* | 2/2009 | Lev ................................. 363/17 |
| 2013/0265804 A1* | 10/2013 | Fu ..................... H02M 3/33576 363/17 |
| 2014/0334189 A1* | 11/2014 | Yan ................... H02M 3/33584 363/17 |

FOREIGN PATENT DOCUMENTS

| JP | H08-289540 | 11/1996 |
| JP | 2005-224012 A | 8/2005 |

* cited by examiner

*Primary Examiner* — Nguyen Tran
*Assistant Examiner* — Kevin H Sprenger
(74) *Attorney, Agent, or Firm* — Harness, Dickey & Pierce, P.L.C.

(57) ABSTRACT

A current resonance type DC-DC converter includes a transformer that has a primary winding and a secondary winding, a switching circuit that has a pair of first switching elements and that is connected to the primary winding, an AC/DC transfer circuit that has four rectifying devices, which are connected in full bridge and include a pair of second switching elements, that is connected to the secondary winding, that converts an AC voltage, which is induced at the secondary winding, into a DC voltage and that outputs the DC voltage, and a control circuit that controls ON and OFF operations of the pairs of the first and second switching elements. The control circuit controls the ON and OFF operations so as to synchronize the pair of the first switching elements with the pair of the second switching elements.

12 Claims, 6 Drawing Sheets

Fig. 3
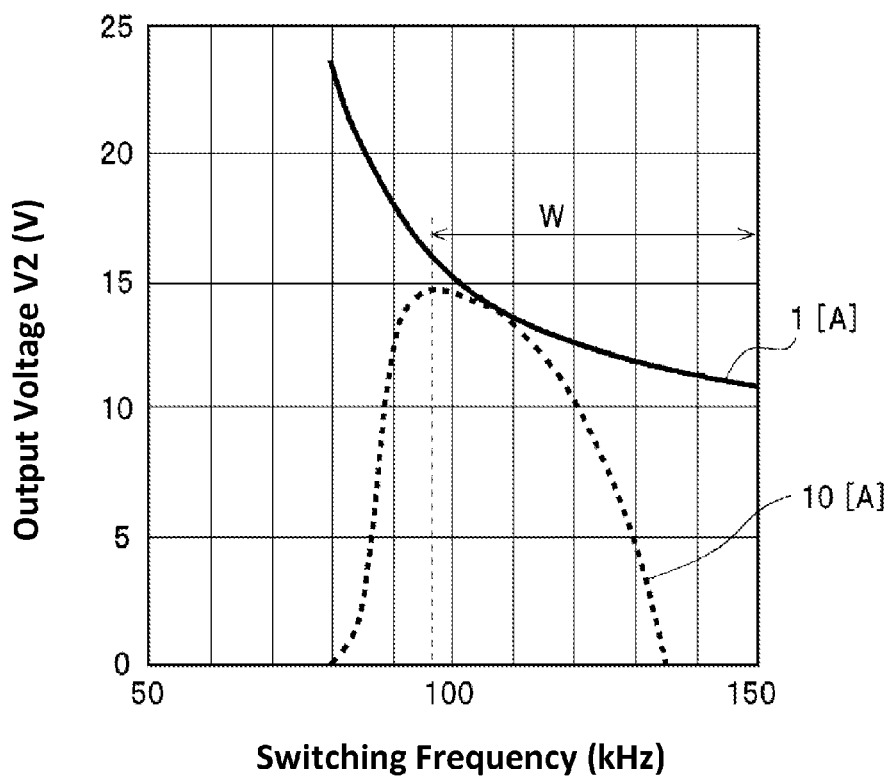
Fig. 4    Prior Art

CURRENT RESONANCE TYPE DC-DC CONVERTER AND METHOD FOR OPERATING CURRENT RESONANCE TYPE DC-DC CONVERTER

CROSS-REFERENCE TO RELATED APPLICATION

This application claims priority to Japanese Patent Application No. 2012-149370 filed Jul. 3, 2012 which is hereby expressly incorporated by reference herein in its entirety.

BACKGROUND

The present invention relates to a current resonance type DC-DC converter (direct current to direct current) and a method for operating a current resonance type DC-DC converter. Specifically, the current resonance type DC-DC converter includes a switching circuit and a resonance circuit that are connected to a primary winding of a transformer. The switching circuit has at least a pair of first switching elements, which are alternatively turned ON and OFF, and is configured with a push-pull type circuit or a bridge type circuit. The resonance circuit generates resonance current at the primary winding of the transformer.

A DC-DC converter that is used in a switching power supply device is disclosed in Japanese Patent Publication Number H08-289540. In this DC-DC converter, a first capacitor for smoothing (smoothing capacitor) is connected between a pair of power supply terminals. Specifically, the smoothing (first) capacitor works as a DC power source of this circuit. Further, a series circuit of first and second switches is connected in parallel to the smoothing capacitor. In this case, the first and second switches are configured with a Metal Oxide Semiconductor (MOS) Field Effect Transistor (FET). Further, the first and second switches work as a control switch, which corresponds to the original functions of a FET, and a diode, which is connected in an antiparallel connection thereto.

Further, a series circuit of a primary winding and a resonance capacitor (an output resonance circuit) are connected between a connection point between the first and the second switches and a lower end of the smoothing capacitor (i.e., a source of the second switch). The primary winding has inductance for resonance. Further, the primary winding of a transformer has excitation inductance in addition to inductance that is configured with leakage inductance. Specifically, the excitation inductance is equivalently connected to the primary winding in parallel. On the other hand, a secondary winding of the transformer is divided into first and second windings by a center tap. The ends of the secondary winding are connected to one terminal of an output smoothing capacitor through third and fourth diodes, respectively. The center tap of the secondary winding is connected to another terminal of the output smoothing capacitor. Further, a pair of output terminals that are connected to a load (not shown) are connected to the output smoothing capacitor. In addition, a control circuit, which alternately turns ON and OFF the first and the second switches, is configured so that an output voltage is controlled to be a stable voltage by changing the ON and OFF frequencies of the first and the second switches according to a change of an input voltage or an output voltage. Specifically, the input voltage corresponds to a charging voltage of the smoothing capacitor and the output voltage corresponds to a charging voltage of the output smoothing capacitor.

In the case in which the smoothing capacitor has been charged in the DC-DC converter, when the first switch is turned ON, an electric current flows in a series resonance circuit by series resonance. The series resonance circuit is configured with a closed circuit that has the smoothing capacitor, the first switch, the primary winding and the resonance capacitor. Similarly, when the second switch is in an ON period, an electric current flows in a series resonance circuit by series resonance. The series resonance circuit is configured with a closed circuit that has the resonance capacitor, the primary winding and the second switch. As a result, because the series resonance circuit that is configured with the leakage inductance of the primary winding and the capacitor is driven by the ON and OFF operations of the first and second switches, an output power that corresponds to the electric current (electric power) based on the series resonance is obtained at the secondary winding of the transformer. The DC-DC converter that has this configuration corresponds to an LLC current resonance type converter. Within a range of frequency in which the output power greatly changes when the frequency is changed, the control circuit controls the output voltage to be stable by changing the ON and OFF frequencies of the first and the second switches (by a frequency control).

The conventional DC-DC converter described above, however, still has some problems to be solved. That is, it is preferred that the conventional DC-DC converter has a configuration in which the output voltage can be greatly changed when the frequency is changed by increasing an $\lambda$ value of the output resonance circuit, which is configured with the primary winding of the transformer and the resonance capacitor, to perform the frequency control by the control circuit as explained above. Note that, in regards to the $\lambda$ value, $\lambda = Lr/Lm$ is satisfied, here Lr corresponds to a value of the leakage inductance and Lm corresponds to a value of the excitation inductance. Here, the value of the leakage inductance, which configures the resonance circuit, needs to become large in order to make the $\lambda$ value large. However, when the value of the leakage inductance becomes large, a large voltage is applied to the transformer. Therefore, a magnetic path cross-sectional area of the transformer needs to be increased. Further, the number of turns of the primary winding and a secondary winding of the transformer need to be increased. As a result, a volume of the transformer is increased. This means that the transformer increases in size. In addition, the resonance circuit can be configured by using an independent inductor instead of the leakage inductance. However, even though this configuration is used, when an inductance value of this inductor becomes large, a large voltage is applied to the inductor and a magnetic path cross-sectional area of the inductor needs to be increased. Further, the number of turns of the inductor needs to be increased. Therefore, the volume of the inductor increases. As a result, the same problem, i.e., that the volume of the DC-DC converter increases, occurs in either configuration discussed above.

On the other hand, it is possible to control the output voltage by changing a duty ratio of the first and the second switches (PWM (pulse width modulation) control). However, when the duty ratio is decreased by this control, a voltage between a drain and a source of the first and second switches may oscillate. In this case, a problem occurs in that a zero volt switch operation becomes difficult.

The present invention aims to solve these problems. Thus, an object of the present invention is to provide a current resonance type DC-DC converter that can perform a zero volt switch operation and that can avoid increasing a volume of the converter.

SUMMARY

In order to achieve the above object, a current resonance type DC-DC converter according to one aspect of the present invention includes a transformer that has a primary winding and a secondary winding, a switching circuit that has a pair of first switching elements and that is connected to the primary winding, an AC/DC (alternating current/direct current) transfer circuit that has four rectifying devices, which are connected in full bridge and include a pair of second switching elements, that is connected to the secondary winding, that converts an AC voltage, which is induced at the secondary winding, into a DC voltage and that outputs the DC voltage, and a control circuit that controls ON and OFF operations of the pairs of the first and second switching elements. The control circuit controls the ON and OFF operations so as to synchronize the pair of the first switching elements with the pair of the second switching elements.

In the current resonance type DC-DC converter according to the aspect of the present invention, the first switching elements are alternatively turned ON and OFF. The switching circuit is configured with a push-pull type circuit or a bridge type circuit.

In the current resonance type DC-DC converter according to the aspect of the present invention, the pair of the second switching elements are provided at a positive potential side or a reference potential side of the four rectifying devices.

In the current resonance type DC-DC converter according to the aspect of the present invention, the control circuit synchronizes one of the first switching elements with one of the second switching elements and synchronizes the other of the first switching elements with the other of the second switching elements. The control circuit adjusts an ON period of each of the second switching elements in accordance with a voltage value of the DC voltage so as to change the ON period during which both of the second switching elements are turned ON.

In the current resonance type DC-DC converter according to the aspect of the present invention, the control circuit controls the ON and OFF operations of the first switching elements with a predetermined frequency and a predetermined duty ratio.

In the current resonance type DC-DC converter of the present invention, a pair of the rectifying devices provided at either of a positive potential side and a reference potential side are configured with the second switching elements. Further, the control circuit controls a DC voltage by changing a simultaneous ON period during which both of the second switching elements are turned ON by adjusting the ON period of each of the second switching elements. Specifically, the simultaneous ON period corresponds to a period of overlapping of a part of the ON period of each second switching element. Therefore, in the current resonance type DC-DC converter of the present invention, even when the ON and OFF frequency of the pair of the first switching elements is constant or is substantially constant, the voltage value of the DC voltage can be controlled. As a result, because a resonant inductor that has a large inductance value to control a frequency is not used, an increase of the volume of the transformer or the resonant inductor can be prevented. Further, an increase of the volume of the DC-DC converter can be prevented. In regards to the control of the DC voltage in the current resonance type DC-DC converter of the present invention, even when a duty ratio of the pair of the first switching elements is constant or is substantially constant, the voltage value of the DC voltage can be controlled. As a result, because the duty ratio of the pair of the first switching elements can always be maintained with a duty ratio that enables a zero volt switch operation, the pair of the first switching elements can certainly be performed by the zero volt switch operation.

Further, in the current resonance type DC-DC converter according to the present invention, the control for the pair of the first switching elements can be simplified because the pair of the first switching elements are turned ON and OFF by a predetermined frequency (constant frequency) and a predetermined duty ratio (constant duty ratio).

BRIEF DESCRIPTION OF THE DRAWINGS

FIG. 3 is a characteristic diagram showing a relationship between a duty ratio of second switching elements 11 and 12 and an output voltage V2 when an output current for a load and an input voltage V1 are constant.

FIG. 4 is a characteristic diagram of each output voltage in a light-load state (output current: 1 [A]) and in a heavy-load state (output current: 10 [A]) when a switching frequency of a DC-DC converter of an LLC resonance PFM (pulse frequency modulation) circuit system is changed.

DESCRIPTION OF EXEMPLARY EMBODIMENTS

A current resonance type DC-DC converter (also referred to as a "DC-DC converter" below) according to an embodiment of the present invention is explained below with reference to the drawings.

Figure 1:
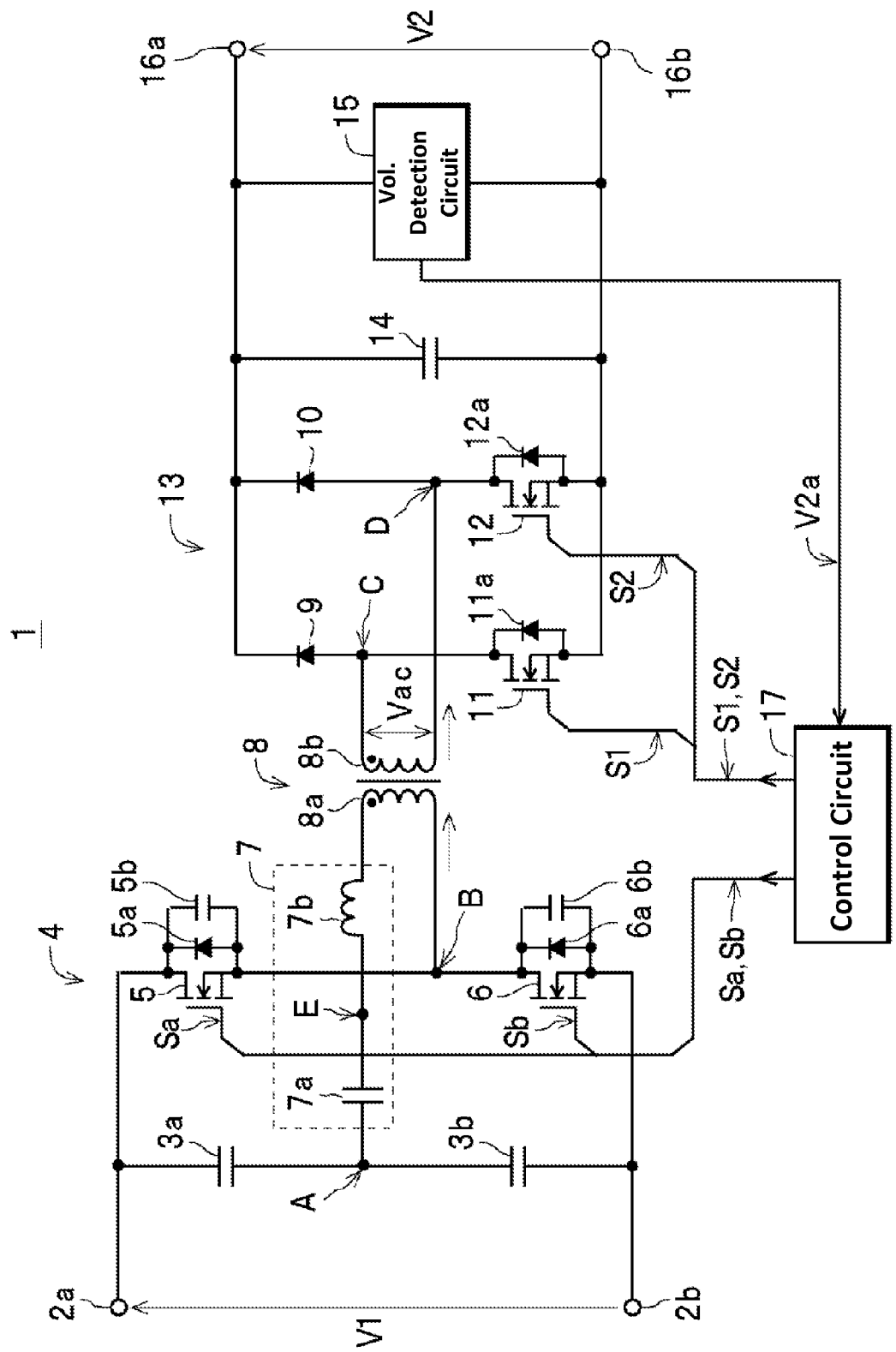
FIG. 1 is a circuit diagram of a DC-DC converter 1 according to an embodiment of the present invention.

First, a configuration of a DC-DC converter 1 will be explained below with reference to the drawings. As an example, the DC-DC converter 1 shown in FIG. 1 is configured with a pair of input terminals 2a and 2b (also referred to as an "input terminal 2" below when not distinguished), a pair of input capacitors 3a and 3b, a switching circuit 4 that is configured with a pair of first switching elements 5 and 6, a resonance circuit 7, a transformer 8, an AC/DC transfer circuit 13 that is configured with four rectifying devices 9, 10, 11 and 12, an output capacitor 14, a voltage detection circuit 15, a pair of output terminals 16a and 16b (also referred to as an "output terminal 16" below when not distinguished) and a control circuit 17. Further, a circuit system of the switching circuit 4 is configured as a half bridge type. In the DC-DC converter 1, an input voltage (DC voltage) V1, which is input to the input terminal 2, is converted to an output voltage (DC voltage) V2 so that the output voltage V2 is output from the output terminal 16.

As shown in FIG. 1, the input voltage V1 is input between the pair of the input terminals 2a and 2b. Specifically, the input voltage V1 of a side of the input terminal 2a becomes a positive potential relative to the input terminal 2b. Further, the pair of the input capacitors 3a and 3b are connected in series with each other. At the same time, the input capacitor 3a is connected to the input terminal 2a. Further, the input capacitor 3b is connected to the input terminal 2b. Thus, the pair of the input capacitors 3a and 3b are connected between the pair of the input terminals 2a and 2b.

The pair of the first switching elements 5 and 6 that configure the switching circuit 4 are connected between the pair of the input terminals 2a and 2b in a state in which the pair of the first switching elements 5 and 6 are connected in series with each other. In the embodiment of the present invention, as an example, the first switching elements 5 and 6 are configured with an N channel MOSFET (metal oxide semiconductor field effect transistor). Specifically, the N channel MOSFET corresponds to a field effect transistor that has parasitic diodes 5a, 6a and stray capacitances 5b, 6b. A drain terminal of the first switching element 5 is connected to the input terminal 2a. A source terminal of the first switching element 5 is connected to a drain terminal of the first switching element 6. At the same time, a source terminal of the first switching element 6 is connected to the input terminal 2b. Further, when driving signals Sa and Sb that are output from the control circuit 17 are respectively input to gate terminals of the first switching elements 5 and 6, the first switching elements 5 and 6 alternatively perform ON and OFF operations.

As an example, the resonance circuit 7 is configured with a resonant capacitor 7a and a resonant inductor 7b that are connected in series. Further, one end of the resonance circuit 7 is connected to a node A connected between the pair of input capacitors 3a and 3b. At the same time, another end of the resonance circuit 7 is connected to one end of a primary winding 8a of a transformer 8 that will be explained below. Further, each value of the resonance capacitor 7a and the resonance inductor 7b of the resonance circuit 7 is defined in advance so as to operate the first switching elements 5 and 6 by a zero voltage switching operation by synchronizing a resonant frequency at the primary side of the transformer 8 through the resonance circuit 7 with a switching frequency of the pair of the first switching elements 5 and 6 (a frequency of the driving signals Sa and Sb).

The resonance inductor 7b can be configured with a leakage inductance of the transformer 8. Further, the resonance inductor 7b can also be configured with an independent inductor that is different from the transformer 8. Further, each of the input capacitors 3a and 3b of the present embodiment also configures the resonance circuit 7 along with the resonance inductor 7b in the same way as the resonance capacitor 7a does. Therefore, a configuration in which only the input capacitors 3a and 3b can be used for the resonance circuit 7 (i.e., the resonance capacitor 7a is omitted) instead of a configuration in which the input capacitors 3a and 3b along with the resonance capacitor 7a are used.

As shown in FIG. 1, the transformer 8 has a primary winding 8a and a secondary winding 8b. Further, a mark "●" shown in FIG. 1 corresponds to a polarity of the primary winding 8a and the secondary winding 8b. In this case, one end of the primary winding 8a is connected to the resonance circuit 7 as explained above. Another end of the primary winding 8a is connected to a node B connected between the pair of the first switching elements 5 and 6. Further, in the transformer 8, an AC voltage Vac is induced from the primary winding 8a to the secondary winding 8b according to switching of the first switching elements 5 and 6 (according to alternatively performing ON and OFF operations of the first switching elements 5 and 6).

As shown in FIG. 1, the four rectifying devices 9, 10, 11 and 12 that configure the AC/DC transfer circuit 13 are connected in full bridge. Further, the AC/DC transfer circuit 13 is located between the secondary winding 8b of the transformer 8 and the pair of the output terminals 16a and 16b. The AC/DC transfer circuit 13 converts the AC voltage Vac that is induced in the secondary winding 8b into the output voltage V2 as a DC voltage. The output voltage V2 is output between the pair of the output terminals 16a and 16b.

Specifically, a pair of the rectifying devices on either of a positive potential side and an negative potential side of the output voltage V2 among the four rectifying devices 9, 10, 11 and 12 (a pair of the rectifying devices 11 and 12 on the negative potential side according to the embodiment of the present invention) are configured with N channel MOSFETs as the second switching elements. The N channel MOSFETs correspond to FETs that has parasitic diodes 11a and 12a, respectively (also referred to as "second switching elements 11 and 12" below). Further, two second switching elements 11 and 12 can be configured with an n-type bipolar transistor or a high electron mobility transistor (HEMT) instead of the FET (field effect transistor) that has the parasitic diode as explained above. On the other hand, another pair of the rectifying devices on another side (a pair of the rectifying devices 9 and 10 on the positive potential side according to the embodiment of the present invention) are configured with diodes as a rectifying device (also referred to as "diodes 9 and 10" below).

The diode 9 and the second switching element 11 are connected in series with each other by connecting an anode terminal of the diode 9 and a drain terminal of the FET (field effect transistor) that configures the second switching element 11. Further, a node C connecting the diode 9 and the second switching element 11 is connected to one end of the secondary winding 8b of the transformer 8. Further, one end (a cathode terminal of the diode 9) of the series circuit of the diode 9 and the second switching element 11 is connected to the positive potential side (the output terminal 16a) of the output voltage V2. Another end (a source terminal of the FET that configures the second switching element 11) of the series circuit is connected to a reference potential side (the output terminal 16b) of the output voltage V2.

Further, the diode 10 and the second switching element 12 are connected in series with each other by connecting an anode terminal of the diode 10 and a drain terminal of the FET (field effect transistor) that configures the second switching element 12. Further, a node D connecting the diode 10 and the second switching element 12 is connected to another end of the secondary winding 8b of the transformer 8. Further, one end (a cathode terminal of the diode 10) of the series circuit of the diode 10 and the second switching element 12 is connected to the positive potential side (the output terminal 16a) of the output voltage V2.

Another end (a source terminal of the FET that configures the second switching element 12) of the series circuit is connected to the reference potential side (the output terminal 16b) of the output voltage V2.

Further, the second switching elements 11 and 12 are turned ON and OFF by driving signals S1 and S2 that are input to each gate terminal of the second switching elements 11 and 12 that are output from the control circuit 17.

The output capacitor 14 is connected between the pair of the output terminals 16a and 16b and smoothes the output voltage V2 (DC voltage) that is output from the AC/DC transfer circuit 13. The voltage detection circuit 15 is connected between the pair of the output terminals 16a and 16b and detects a voltage value V2a of the output voltage V2. Then, the voltage detection circuit 15 outputs the detected voltage value V2a to the control circuit 17.

Figure 2:
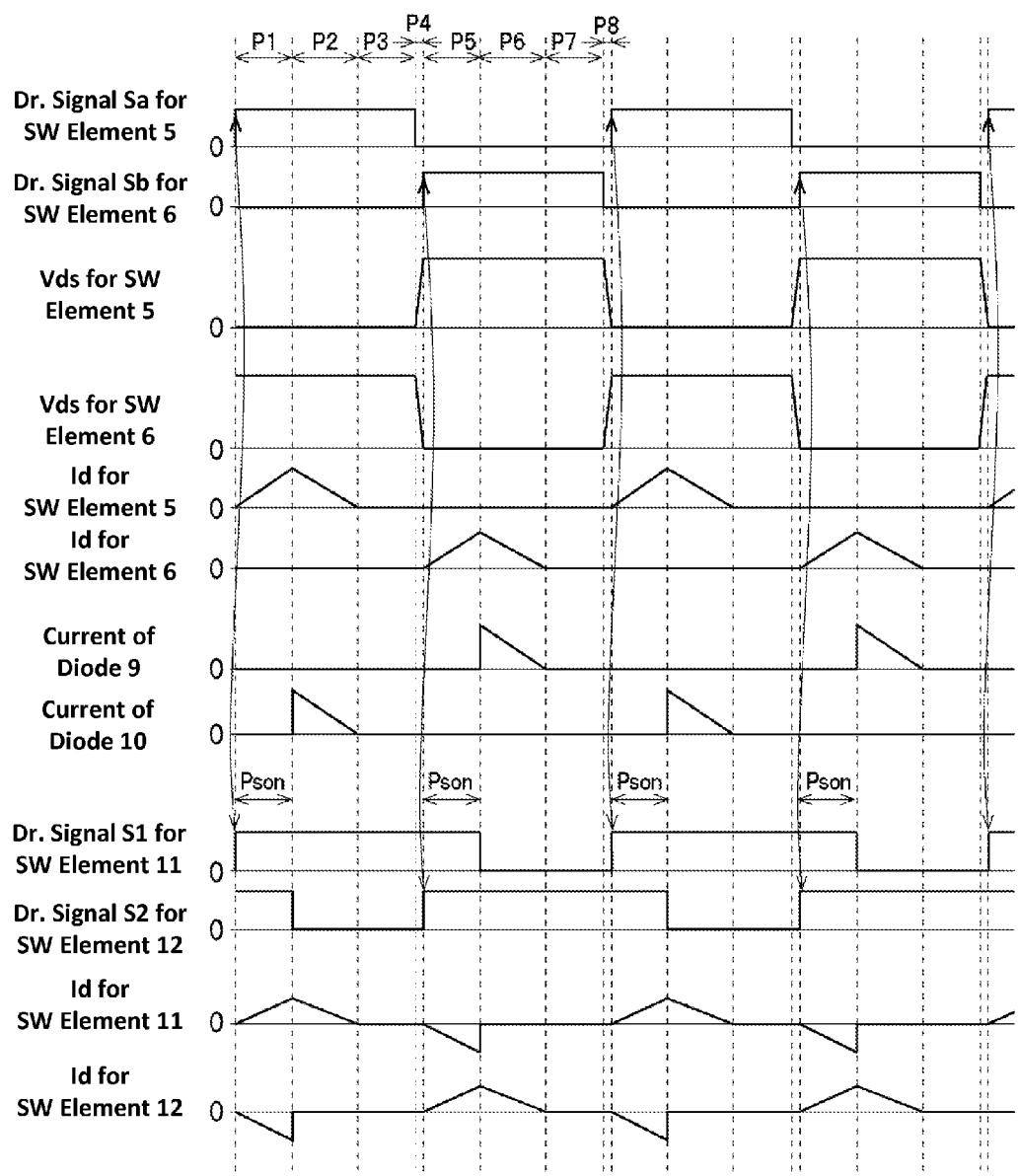
FIG. 2 is a waveform diagram in order to explain an operation of the DC-DC converter 1 according to an embodiment of the present invention.

The control circuit 17 is, for instance, configured by using a DSP (digital signal processor). Further, the control circuit 17 generates and outputs the driving signals Sa and Sb for the first switching elements 5 and 6 and the driving signals S1 and S2 for the second switching elements 11 and 12. In this case, as shown in FIG. 2, the control circuit 17 generates and outputs the driving signals Sa and Sb that have a dead time therebetween with a predetermined frequency (a constant frequency) and a predetermined duty ratio (a constant duty ratio). Specifically, the predetermined frequency is, for instance, within a range of several tens kHz to several hundreds kHz. The predetermined duty ratio is, for instance, about 0.48.

On the other hand, as shown in FIG. 2, the control circuit 17 outputs the driving signal S1 that is synchronized with the driving signal Sa. Further, the control circuit 17 outputs the driving signal S2 that is synchronized with the driving signal Sb. In the embodiment of the present invention, the control circuit 17 outputs the driving signal S1 in synchronization with an output start time of the driving signal Sa. Further, the control circuit 17 outputs the driving signal S2 in synchronization with an output start time of the driving signal Sb. As a result, the control circuit 17 turns one of the pair of the second switching elements 11 and (the second switching element 11) ON in synchronization with an ON start time of one of the pair of the first switching elements 5 and 6 (the first switching element 5). Specifically, the ON start times for the second switching element 11 and the first switching element 5 are adjusted. Similarly, the control circuit 17 turns another of the pair of the second switching elements 11 and 12 (the second switching element 12) ON in synchronization with an ON start time of another of the pair of the first switching elements 5 and 6 (the first switching element 6). Specifically, the ON start times for the second switching element 12 and the first switching element 6 are adjusted.

Further, while the control circuit 17 maintains each duty ratio value of the driving signals S1 and S2 to be more than 0.5, the control circuit 17 outputs the driving signals S1 and S2 in a state of adjusting both values as the same ones. As a result, the control circuit 17 controls the ON and OFF states of the pair of the second switching elements 11 and 12 so as to generate a simultaneous ON period Pson during which a part of the ON period of each of the second switching element 11 an 12 is overlapped. Further, the control circuit 17 changes a length of the simultaneous ON period Pson by equally changing the ON periods of the pair of the second switching elements 11 and 12 by equally changing the driving signals S1 and S2 according to the voltage value V2a of the output voltage V2 that is detected in the voltage detection circuit 15. Here, adjusting both values of the duty ratios for the driving signals S1 and S2 as the same ones means that, for example, when the duty ratio of the driving signal S1 is changed to 0.55, the duty ratio of the driving signal S2 is also changed to 0.55 (is adjusted to the dame value). Similarly, when the duty ratio of the driving signal S1 is changed to 0.60, the duty ratio of the driving signal S2 is also changed to 0.60.

Further, in the embodiment of the present invention, the driving signal S1 is output in synchronization with the driving signal Sa. The driving signal S2 is output in synchronization with the driving signal Sb. As an application for these synchronizations, an output start time of the driving signal S1 is synchronized with an output start time of the driving signal Sa. Similarly, an output start time of the driving signal S2 is synchronized with an output start time of the driving signal Sb. However, the present invention is not limited to this embodiment. As another example of outputting the driving signal S1 synchronized with the driving signals Sa and outputting the driving signal S2 synchronized with the driving signal Sb, the following configuration can also be adopted. The output start time of the driving signal S1 is shifted back and forth for a predetermined time relative to the output start time of the driving signal Sa as a standard output start time. Further, the output start time of the driving signal S2 is shifted back and forth for the same predetermined time relative to the output start time of the driving signal Sb as a standard output start time.

Next, an operation of the DC-DC converter 1 is explained with reference to the drawing.

As shown in FIG. 2, in the DC-DC converter, the control circuit 17 generates and outputs the driving signals Sa and Sb that have a dead time therebetween with a predetermined frequency (a constant frequency) and a predetermined duty ratio (a constant duty ratio). Further, while the control circuit 17 maintains each value of the duty ratios of the driving signals S1 and S2 to be more than 0.5 and equalizes the duty ratios, the control circuit 17 outputs the driving signal S1 in synchronization with the output start time of the driving signal Sa. Similarly, the control circuit 17 outputs the driving signal S2 in synchronization with the output start time of the driving signal Sb.

In this case, in a period P1 shown in FIG. 2, i.e., during a period from the output start time of the driving signal Sa and the driving signal S1 to an output end time of the driving signal S2, the first switching element 5 is turned ON by the driving signal Sa. At the same time, the second switching elements 11 and 12 are turned ON by the driving signals S1 and S2. Therefore, in the period P1, an electric current flows in the primary winding 8a in an arrow direction from another end thereof via the input terminal 2a, the first switching element 5 that is turned ON and the node B on the primary side of the transformer 8. Further, an electric current also flows in the primary winding 8a in the arrow direction from another terminal of the input capacitor 3a via the first switching element 5 that is turned ON and the node B. The electric current that flows in the primary winding 8a as explained above is discharged from one end of the primary winding 8a and reaches the node A through the resonance circuit 7. Then, the electric current divided into the sides of the input capacitor 3a and the input capacitor 3b. At this time, the electric current that flows in the side of the input capacitor 3a goes back to the input capacitor 3a. On the other hand, the electric current that flows in the side of the input capacitor 3b goes back to the input terminal 2b. In this state, the electric current that flows to the first switching element 5, which is turned ON, corresponds to a drain current Id of the first switching element 5. Specifically, the drain current Id of the first switching element 5 also corresponds to the electric current that flows in the primary winding 8a in the arrow direction from another end thereof. As shown in FIG. 2, a current value of the electric current flowing in the first switching element 5 substantially linearly increases with a slope that is defined by the leakage inductance of the transformer 8, the resonant inductor 7b, a voltage potential difference between the input voltage V1 and a voltage at a node E provided between the resonant capacitor 7a and the resonance inductor 7b.

Further, in the period P1, the AC voltage Vac is induced in the secondary side of the transformer 8 in a state in which another end of the secondary winding 8b becomes a positive voltage relative to one end of the secondary winding 8b. Therefore, an electric current flows toward a node D in an arrow direction from the other end of the secondary winding 8b. The electric current flows in the one end of the secondary winding 8b through the second switching element 12 and the second switching element 11 that are turned ON. In other words, as shown in FIG. 2, the electric currents (drain currents Id), which has the same current values and opposite polarities, respectively flow in the second switching elements 11 and 12. Further, the current value of the electric current increases almost linearly according to the current value of the electric current that flows in the primary winding 8a. As a result, energy is accumulated into the leakage inductance of the transformer 8 and the resonance inductor 7b. Further, in the period P1, the output voltage V2 is supplied to a load (not shown) that is connected between the pair of the output terminals 16a and 16b from the output capacitor 14.

In the next period P2 in which the output of the driving signal Sa and the driving signal S1 are continued, and on the other hand, in which the output of the driving signal S2 is finished, the second switching element 12 shifts to be in an OFF state. Further, in the period P2, only the first switching element 5 and the second switching element 11 are turned ON. Therefore, in the period P2, the electric current flows in a path discussed next in the secondary side of the transformer 8 based on the energy accumulated into the leakage inductance of the transformer 8 and the resonance inductor 7b. The path starts from the other end of the secondary winding 8b and continues through the diode 10, the output capacitor 14 and the load (not shown) connected between the pair of the output terminals 16a and 16b. Then, the path further continues through an end of a reference potential side of the output capacitor 14, the output terminal 16b and the second switching element 11 and returns to the one of the secondary winding 8b. In the period P2, this electric current, which corresponds to the drain current Id of the second switching element 11 (the electric current flowing in the diode 10), substantially linearly decreases with a slope defined below and reaches zero from the peak current in the period P1. This slope is defined by converted inductance and a difference voltage. The converted inductance is obtained by performing a secondary side conversion of the leakage inductance of the transformer 8 and the resonance inductor 7b. The difference voltage is obtained by subtracting a converted voltage from the output voltage V2. Here, the converted voltage is obtained by performing a secondary side conversion of a potential difference between a voltage at a node E and the input voltage V1.

During the period P2 in the primary side of the transformer 8, the electric current, which corresponds to a drain current Id of the first switching element 5, flows in the same path as in the period P1 as explained above. A current value of this electric current decreases substantially linearly according to the current value of the electric current that flows in the secondary winding 8b and reaches zero.

In a period P3, the first switching element 5 and the second switching element 11 are continuously turned ON because the outputs of the driving signal Sa and the driving signal S1 continue. However, in the period P2, almost all energy, which is accumulated into the transformer 8, is discharged in the secondary side of the transformer 8. As a result, because a voltage value of the AC voltage Vac that is induced at the secondary winding 8b decreases, the diode 10 that is in the ON state is transferred to be in the OFF state. Therefore, the secondary winding 8b and the second switching element 11 are maintained in a state in which an electric current does not flow. Further, in the period P3, the output voltage V2 is supplied to the load, which is connected between the pair of the output terminals 16a and 16b, from the output capacitor 14.

On the other hand, in the period P3 in the primary side of the transformer 8, although the same electric path of the electric current as the period P1 explained above is continuously formed, the voltage of the node E reaches almost the same value of the voltage value of the input voltage V1 that is input from the pair of the input terminals 2a and 2b at the time of the end of the period P2. That is because a charged voltage of the resonance capacitor 7a is changed by flow of the electric current in the resonance capacitor 7a during the periods P1 and P2. Therefore, although an electric current, which gradually increases with a slope defined below, flows in the above electric path, its electric current value is insignificant. This slope is defined by a potential difference between the input voltage V1 and the voltage of the node E, and the excitation inductance of the transformer 8. Note that the gradually increased electric current as explained above corresponds to the electric current flowing in the primary winding 8a in an arrow direction shown in FIG. 1. Further, from the period P1 to the period P3, because the first switching element 5 is turned ON, a voltage Vds between a drain and a source of the first switching element 6, which is in the OFF state, is maintained as substantially the same voltage as the output voltage V1. Therefore, a stray capacitance 6b of the first switching element 6 is charged as substantially the same voltage as the input voltage V1.

In the next period P4, i.e., after the output of the driving signal Sa ends and before the output of the driving signal Sb starts (the dead time period of the driving signals Sa and Sb), because the output of the driving signal S1 is continued, only the second switching element 11 is continuously turned ON. However, even in this period P4, because almost all energy accumulated in the transformer 8 is discharged, the secondary winding 8b and the second switching element 11 are maintained in a state in which the electric current does not flow in the same manner as the period P3 as explained above. Further, in the period P4, the output voltage V2 is supplied to the load that is connected between the pair of the output terminals 16a and 16b from the output capacitor 14.

On the other hand, in the period P4 in the primary side of the transformer 8, because a state of the first switching element 5 is shifted from the ON state to the OFF state, the first switching elements 5 and 6 are both in the OFF state. However, because the electric current flows in the primary winding 8a in the arrow direction shown in FIG. 1 in the period P3 that is just before the period P4, the electric current, which is in the same direction, is generated at the primary winding 8a in the period P4. This electric current is output from the one end of the primary winding 8a and reaches the node A through the resonance circuit 7. Then, the electric current divided into two directions for the input capacitors 3*a* and 3*b* at the node A. In this case, the electric current that flows in the input capacitor 3*a* flows in a path, the stray capacitance 5*b* of the first switching element 5, the node B and the other end of the primary winding 8*a* in this order. As a result, because the stray capacitance 5*b* is charged, a voltage Vds between a drain and a source of the first switching element 5 rapidly increases so as to reach substantially the same voltage as the input voltage V1. On the other hand, the electric current that flows in the input capacitor 3*b* flows from a source terminal to a drain terminal of the first switching element 6 through the stray capacitance 6*b* and reaches the node B. Further, this electric current continues flowing toward the other end of the primary winding 8*a* from the node B. Therefore, the voltage, which is charged in the stray capacitance 6*b* as substantially the same voltage as the input voltage V1 during the period P3 and which corresponds to the voltage Vds between the drain and the source of the first switching element 6, rapidly decreases and reaches substantially zero voltage because of discharging from the stray capacitance 6*b*.

In the period P5, i.e., after the outputs of the driving signal Sb and the driving signal S2 start until the output of the driving signal S1 ends, the first switching element 6 is turned ON by the driving signal Sb. At the same time, the second switching elements 11 and 12 are turned ON by the driving signals S1 and S2. Before the period P5, the first switching element 6 is in the OFF state because the electric current flows from the source terminal to the drain terminal through the parasitic diode 6*a* so that the voltage Vds between the drain terminal and the source terminal reaches substantially zero voltage. However, in the period P5, the first switching element 6 is turned ON by the driving signal Sb. In other words, the zero voltage switch operation is performed. Therefore, a switching loss of the first switching element 6 significantly decreases.

Further, in the period P5 in the primary side of the transformer 8, the electric current flows in the one end of the primary winding 8*a* via the input terminal 2*a*, the input capacitor 3*a*, the node A and the resonance circuit 7. In addition, the electric current flows in the one end of the primary winding 8*a* via the node A and the resonance 7 from the input capacitor 3*b*. The electric current that flows in the primary winding 8*a* as discussed above flows out from the other end of the primary winding 8*a* and reaches to the input terminal 2*b* and the reference potential side terminal of the input capacitor 3*b* through the first switching element 6, which is in the ON state.

In this state, a current value of the electric current that flows in the first switching element 6, which is in the ON state, increases substantially linearly with a slope defined below. This slope is defined by the leakage inductance of the transformer 8, the resonant inductor 7*b* and the voltage at the node E. Specifically, this electric current flowing in the first switching element 6 corresponds to the drain current Id of the first switching element 6 and in other words, corresponds to an electric current flowing from the one end to the other end of the primary winding 8*a*. Note that this defined slope is the same slope as the drain current Id of the first switching element 5 in the period P1.

Further, in the period P5 in the secondary side of the transformer 8, the AC voltage Vac is induced in the secondary winding 8*b* in a state in which another end becomes a positive voltage relative to one end of the secondary winding 8*b*. Therefore, the electric current flows out from the one end of the secondary winding 8*b* toward the node C because the electric current is generated in the secondary winding 8*b* in an opposite arrow direction of the arrow direction shown in FIG. 1. This electric current flows in the other end of the secondary winding 8*b* via the second switching element 11 that is in the ON state and the second switching element 12 that is in the ON state. In other words, as shown in FIG. 2, the electric currents, which correspond to the drain currents Id, flow in each of the second switching elements 11 and 12 under the following condition. These electric currents have the same voltage values, opposite polarities to each other, and reverse flow directions compared with the period P1. Further, the current value of these electric current increases substantially linearly according to the current value of the electric current that flows in the primary winding 8*a* in the same manner as the period P1. As a result, energy is accumulated into the transformer 8. Further, in the period P5, the output voltage V2 is supplied to the load that is connected between the pair of the output terminal 16*a* and 16*b* from the output capacitor 14.

In the next period P6 in which the outputs of the driving signal Sb and the driving signal S2 are continued, and on the other hand, in which the output of the driving signal S1 is finished, the second switching element 11 shifts to be in the OFF state. Further, in the period P6, only the first switching element 6 and the second switching element 12 are turned ON. Therefore, in the period P6, the electric current flows in a path discussed next in the secondary side of the transformer 8 based on the energy accumulated into the transformer 8. The path starts from the one end of the secondary winding 8*b* and continues through the diode 9, the output capacitor 14 and the load (not shown) connected between the pair of the output terminals 16*a* and 16*b*. Then, the path further continues through an end of a reference potential side of the output capacitor 14, the output terminal 16*b* and the second switching element 12 and returns to the other of the secondary winding 8*b*. In the period P6, this electric current, which corresponds to the drain current Id of the second switching element 12 (the electric current flowing in the diode 9), substantially linearly decreases with a slope defined below and reaches zero from the peak current in the period P5. This slope is defined by converted inductance and a difference voltage. The converted inductance is obtained by performing a secondary side conversion of the leakage inductance of the transformer 8 and the resonance inductor 7*b*. The difference voltage is obtained by subtracting a converted voltage from the output voltage V2. Here, the converted voltage is obtained by performing a secondary side conversion of a voltage at the node E.

During the period P6 in the primary side of the transformer 8, the electric current, which corresponds to a drain current Id of the first switching element 6, flows in the same path as in the period P5 as explained above. A current value of this electric current decreases substantially linearly according to the current value of the electric current that flows in the secondary winding 8*b* and reaches zero.

In the period P7, the first switching element 6 and the second switching element 12 are continuously turned ON because the outputs of the driving signal Sb and the driving signal S2 continue. However, in the period P7, almost all energy, which is accumulated into the transformer 8, is discharged in the secondary side of the transformer 8. As a result, because a voltage value of the AC voltage Vac that is induced at the secondary winding 8*b* decreases, the diode 10 that is in the ON state is transferred to be in the OFF state. Therefore, the secondary winding 8*b* and the second switching element 12 are maintained in a state in which an electric current does not flow. Further, in the period P7, the output voltage V2 is supplied to the load, which is connected between the pair of the output terminals 16a and 16b, from the output capacitor 14.

On the other hand, in the period P7 in the primary side of the transformer 8, although the same electric path of the electric current as the period P5 explained above is continuously formed, the voltage of the node E reaches substantially zero voltage at the time of the end of the period P6. That is because a charged voltage of the resonance capacitor 7a is changed by flow of the electric current in the resonance capacitor 7a during the periods P1 and P2. Therefore, although an electric current, which gradually increases with a slope defined below, flows in the above electric path, its electric current value is insignificant. This slope is defined by the voltage of the node E and the excitation inductance of the transformer 8. Note that the gradually increased electric current as explained above corresponds to the electric current flowing in the primary winding 8a in a reverse arrow direction of the arrow direction shown in FIG. 1. Further, from the period P5 to the period P7, because the first switching element 6 is turned ON, a voltage Vds between a drain and a source of the first switching element 5, which is in the OFF state, is maintained as substantially the same voltage as the output voltage V1. Therefore, a stray capacitance 5b of the first switching element 5 is charged as substantially the same voltage as the input voltage V1.

In the next period P8, i.e., after the output of the driving signal Sb ends and before the output of the driving signal Sa starts (the dead time period of the driving signals Sa and Sb), because the output of the driving signal S2 is continued, only the second switching element 12 is continuously turned ON. However, even in this period P8, because almost all energy accumulated in the transformer 8 is discharged, the secondary winding 8b and the second switching element 12 is maintained in a state in which the electric current does not flow in the same manner as the period P7 as explained above. Further, in the period P8, the output voltage V2 is supplied to the load that is connected between the pair of the output terminals 16a and 16b from the output capacitor 14.

On the other hand, in the period P8 in the primary side of the transformer 8, because a state of the first switching element 6 is shifted from the ON state to the OFF state, the first switching elements 5 and 6 are both in the OFF state. However, because the electric current flows in the primary winding 8a in the reverse arrow direction of the arrow direction shown in FIG. 1 in the period P7 that is just before the period P8, the electric current, which is in the same direction, is generated at the primary winding 8a in the period P8. This electric current is output from the other end of the primary winding 8a and reaches the node B. Then, the electric current divided into two directions for the stray capacitance 5b of the first switching element 5 and the stray capacitance 6b of the first switching element 6 at the node B. In this case, the electric current that flows in the stray capacitance 5b flows in a path, the source terminal side to the drain terminal side of the first switching element 5, the input capacitor 3a, the node A, the resonance circuit 7 and the one end of the primary winding 8a in this order. As a result, because the stray capacitance 5b, which is charged as the same voltage as the input voltage V1, is rapidly discharged, a voltage Vds between a drain and a source of the first switching element 5 rapidly decreases so as to reach substantially zero voltage. On the other hand, the electric current that flows in the stray capacitance 6b flows toward the node A through the input capacitor 3b and flows (returns) toward the one end of the primary winding 8a through the resonance circuit 7. Therefore, because the stray capacitance 6b is charged, the voltage Vds between the drain and the source of the first switching element 6 rapidly increases so as to reach the same voltage as the input voltage V1.

After this period P8 is finished, the periods P1-P8 that are explained above are repeated. In this case, in the new period P1 that continues from the period P8, in other words, during a period from the output start time of the driving signal Sa and the driving signal S1 to the output end time of the driving signal S2, the first switching element 5 is turned ON by the driving signal Sa. At the same time, the second switching elements 11 and 12 are turned ON by the driving signals S1 and S2. In this case, an electric current flows from the source terminal side to the drain terminal side through the parasitic diode 5a of the first switching element 5, which is in the OFF state. Thus, when the voltage Vds between the drain and the source of the first switching element 5 reaches substantially zero voltage, the first switching element 5 is turned ON by the driving signal Sa. In other words, the zero voltage switch operation is performed. Therefore, a switching loss of the first switching element 5 significantly decreases.

Further, the control circuit 17 repeats the above operations. At the same time, the control circuit 17 equally changes (longer or shorter ON periods) the driving signals S1 and S2 according to the voltage value V2a of the output voltage V2 that is detected by the voltage detection circuit 15. Thus, the control circuit 17 equally changes (longer or shorter) the ON periods of the pair of the second switching elements 11 and 12. As a result, a voltage value of the output voltage V2 is maintained as a desired value by changing the length of the simultaneous ON period Pson during which both of the second switching elements 11 and 12 are turned ON.

The operation of the control circuit 17 in which the output voltage V2 is maintained as the desired voltage value is specifically explained. The input voltage V1 is set to 50[V] and the electric current that is supplied to the load is set to 10 [A] by using the transformer 8 in which a number of turns of the secondary winding 8b is defined to a ½ of a number of turns of the primary winding 8a. In the above condition, when the duty ratio of the driving signals S1 and S2 (that is, the duty ratio of the ON periods of the second switching elements 11 and 12) is changed, an output voltage characteristics of the output voltage V2 of the DC-DC converter 1 is shown in FIG. 3. According to the output voltage characteristics, in the DC-DC converter 1, the output voltage V2 can be changed voluntarily within a range between about 12[V] and about 42[V] by changing the duty ratios of the driving signal S1 and S2 within a range over 0.5. Therefore, even when the input voltage V1 is changed and even when the output voltage V2 is changed according to the change of the state of the load, the control circuit 17 maintains the voltage value V2a as the desired voltage value by controlling the duty ratio of the driving signal S1 and S2 by detecting the change of the voltage value V2a according to the change of the input voltage V1 and the change of the voltage value V2a according to the change of the state of the load through the voltage detection circuit 15. Specifically, when the voltage value V2a is under the desired voltage value, the control circuit 17 lengthens the simultaneous ON period Pson of the second switching elements 11 and 12 by increasing the duty ratios of the driving signals S1 and S2. On the other hand, when the voltage value V2a is over the desired voltage value, the control circuit 17 shortens the simultaneous ON period Pson of the second switching elements 11 and 12 by decreasing the duty ratios of the driving signals S1 and S2. As a result, the voltage value V2a is maintained as the desired voltage value.

As discussed above, in the DC-DC converter 1, the control circuit 17 turns ON one (the second switching element 11) of the pair of the second switching elements 11 and 12, which connects to the reference potential side in the secondary side of the transformer 8, in synchronization with an ON start time of one (the first switching element 5) of the pair of the first switching elements 5 and 6. Similarly, the control circuit 17 turns ON another (the second switching element 12) of the pair of the second switching elements 11 and 12 in synchronization with the ON start time of another (the first switching element 6) of the pair of the first switching elements 5 and 6. Further, the control circuit 17 adjusts (longer of shorter) an ON period of the pair of the second switching elements 11 and 12 in accordance with the voltage value V2a of the output voltage V2 so as to change the simultaneous ON period Pson during which both of the second switching elements 11 and 12 are turned ON.

Therefore, in the type DC-DC converter 1 as discussed above, even when the ON and OFF frequency of the pair of the first switching elements 5 and 6 is constant or is substantially constant, the voltage value V2a of the output voltage V2 can be controlled. As a result, because the resonant inductor 7b that has a large inductance value to control a frequency is not used, an increase of the volume of the transformer 8 or the inductor can be prevented. Further, an increase of the volume of the DC-DC converter 1 can be prevented. In regards to the control of the output voltage V2 in the DC-DC converter 1, even when a duty ratio of the pair of the first switching elements 5 and 6 is constant or is substantially constant, the voltage value V2a of the output voltage V2 can be controlled. As a result, because the duty ratio of the pair of the first switching elements 5 and 6 can always be maintained with a duty ratio that enables a zero volt switch operation, the pair of the first switching elements 5 and 6 can certainly be performed by the zero volt switch operation.

Further, in the DC-DC converter 1 as discussed above, the control for the pair of the first switching elements 5 and 6 can be simplified because the pair of the first switching elements 5 and 6 are turned ON and OFF by a predetermined frequency (constant frequency) and a predetermined duty ratio (constant duty ratio).

Further, in, in regards to the output voltage characteristics for the switching frequency in the conventional LLC current resonance type converter as shown in FIG. 4, there are big differences between a light-load state and a heavy-load state. For instance, in the light-load state, an output current is 1 [A]. For instance, in the heavy-load state, the output current is 10 [A]. Specifically, in the conventional LLC current resonance type converter, when the load gets heavy, a peak value of the output voltage V2 decreases. At the same time, a frequency of the peak value gradually moves to a high frequency side and approaches a resonant frequency (100 kHz in FIG. 4). In this LLC current resonance type converter, within a frequency range that is indicated with a reference numeral W in FIG. 4, the switching frequency is changed so as to control the output voltage V2. Specifically, the smallest frequency (a higher frequency than the frequency of the peak value) within the frequency range is a lower limit in the heavy-load state. Here, the smallest frequency corresponds to a frequency of a monotonic decrease of the output voltage characteristics with regards to the switching frequency. The largest frequency within the frequency range is an upper limit in the light-load state. The largest frequency corresponds to a frequency of a large change of the output voltage when the frequency is changed in the light-load state. However, the resonant frequency may be changed ascribable to a dispersion of either value of a resonance capacitor that configures a resonance circuit and resonance inductor. In this case, when the resonant frequency is shifted to the side of the high frequency beyond assumption, a frequency of the peak value of the output voltage V2 is also shifted to the side of the high frequency according to this. As a result, when in particular the frequency of the peak value is close to the resonant frequency and is in the heavy-load state, the frequency of the peak value may be within the frequency range W. Therefore, in this case, the LLC current resonance type converter may fall into a state in which the output voltage V2 cannot be controlled as a desired voltage value or in which the zero voltage switch operation cannot be performed.

Figure 5:
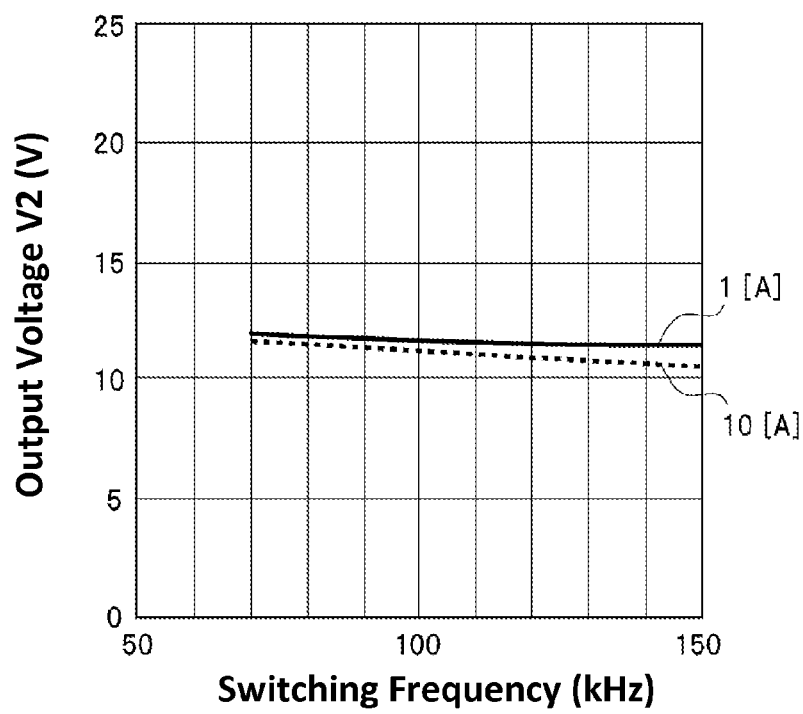
FIG. 5 is a characteristic diagram of each output voltage in a light-load state (output current: 1 [A]) and in a heavy-load state (output current: 10 [A]) when a switching frequency of the first switching elements 5 and 6 in the DC-DC converter 1 is changed according to an embodiment of the present invention.

In contrast, because the DC-DC converter 1 according to the embodiment of the present invention has a configuration in which an ON period of the pair of the second switching elements 11 and 12 of the AC/DC transfer circuit 13 that is located on the secondary side of the transformer 8 is adjusted (longer or shorter, i.e., a duty ratio is changed) and the voltage value V2a of the output voltage V2 is controlled, it is not necessary to perform frequency control. Therefore, the DC-DC converter 1 according to the embodiment of the present invention does not need to use the resonant inductor 7b for performing the frequency control for a large inductance value or the transformer 8 in which the leakage inductance is large (a loose coupling transformer). Although the above configuration is used, as shown in FIG. 5, it can be realized that the output voltage V2 is maintained as substantially a constant value (stable) even in the light-load state or in the heavy-load state, and further, regardless of change of the switching frequency of the pair of the first switching elements 5 and 6 of the switching circuit 4 that is located on the primary side of the transformer 8. Specifically, for instance, in the light-load state, the output current is 1 [A]. For instance, in the heavy-load state, the output current is 10 [A]. Therefore, in the DC-DC converter 1 according to the embodiment of the present invention, even when the resonant frequency is changed ascribable to a dispersion of either value of the resonance capacitor 7a that configures the resonance circuit 7 and the resonance inductor 7b, the voltage value V2a of the output voltage V2 can certainly be maintained as a desired voltage value.

Figure 6:
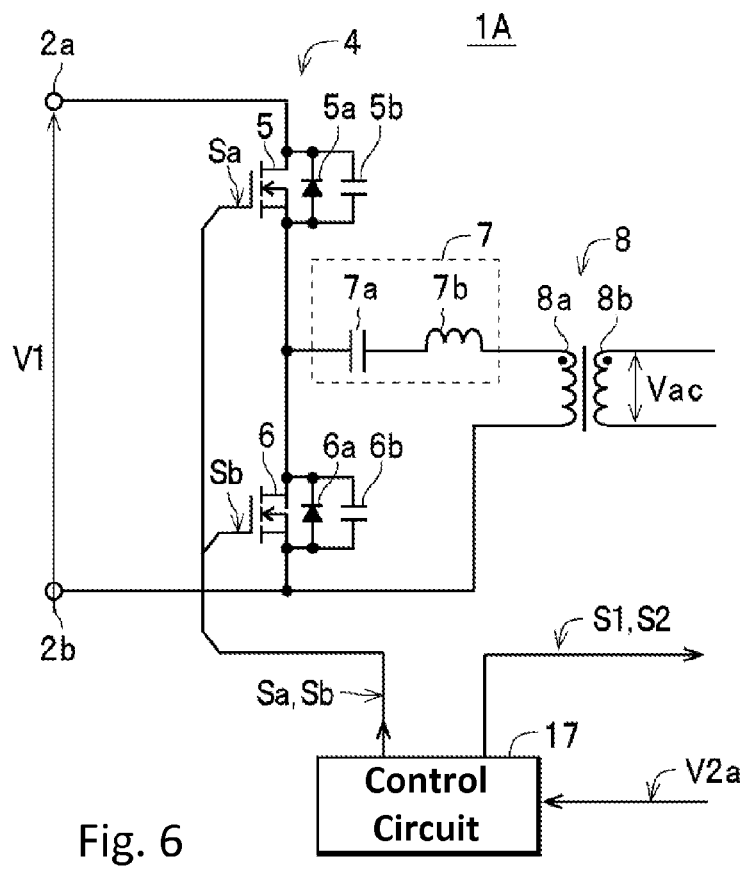
FIG. 6 is a circuit diagram of a primary side of a transformer 8 in a DC-DC converter 1A according to an embodiment of the present invention.
Figure 7:
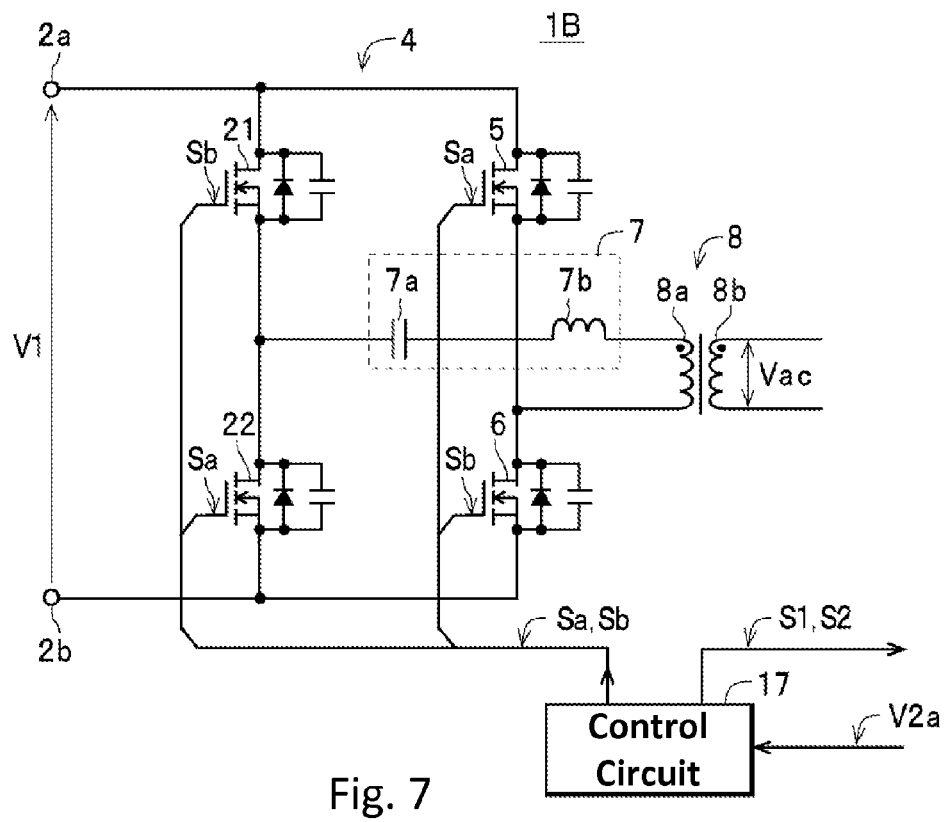
FIG. 7 is a circuit diagram of a primary side of a transformer 8 in a DC-DC converter 1B according to an embodiment of the present invention.

Further, in the DC-DC converter 1 as explained above, a half bridge type in which the pair of the input capacitors 3a and 3b are used is adopted as the circuit system of the switching circuit 4. However, a half bridge type in which the pair of the input capacitor 3a and 3b are not used can be also adopted as a DC-DC converter 1A shown in FIG. 6. Further, as a DC-DC converter 1B shown in FIG. 7, a full bridge type in which the pair of the input capacitors 3a and 3b are omitted and in which other pair of the first switching elements 21 and 22 are located in the switching circuit 4 can be also adopted. In the DC-DC converter 1B, as shown in FIG. 7, the first switching elements 5 and 22 are turned ON and OFF at the same time by a common driving signal Sa. Similarly, the first switching elements 6 and 21 are turned ON and OFF at the same time by a common driving signal Sb. Further, the circuit configuration of the secondary side of the transformer 8 in the DC-DC converters 1A and 1B is the same as the circuit configuration of the DC-DC converter 1. Therefore, a diagram and an explanation are omitted.

Figure 8:
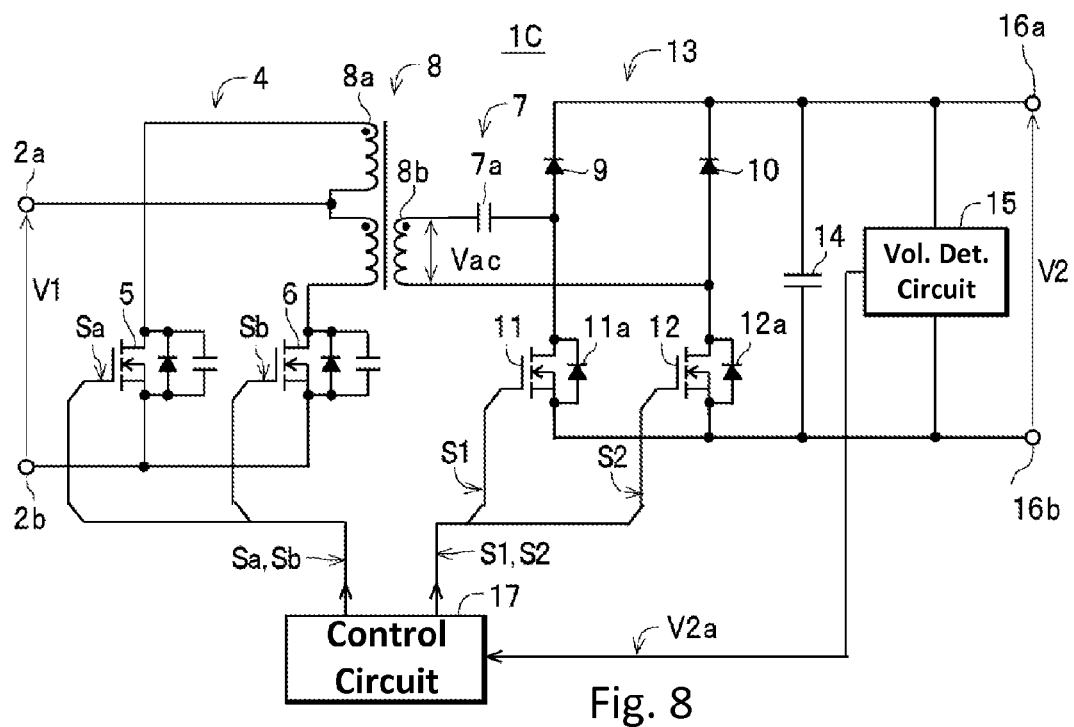
FIG. 8 is a circuit diagram of a DC-DC converter 1C according to an embodiment of the present invention.

Further, as a DC-DC converter 1C shown in FIG. 8, a push-pull type can be adopted as a circuit system of the switching circuit 4. In the DC-DC converter 1C, a configuration in which the transformer 8 is used and the resonance capacitor 7a is connected to the secondary winding 8b as shown in FIG. 8. Specifically, the transformer 8 has the primary winding 8a in which a center tap is provided. The resonance capacitor 7a configures the resonance circuit 7 along with the leakage inductance (not shown) of the secondary winding 8b. Further, a redundant explanation of the same configuration as the DC-DC converter 1 is omitted by using the same reference numerals. The DC-DC converters 1A-1C can also take the same effects as the DC-DC converter 1.

Figure 9:
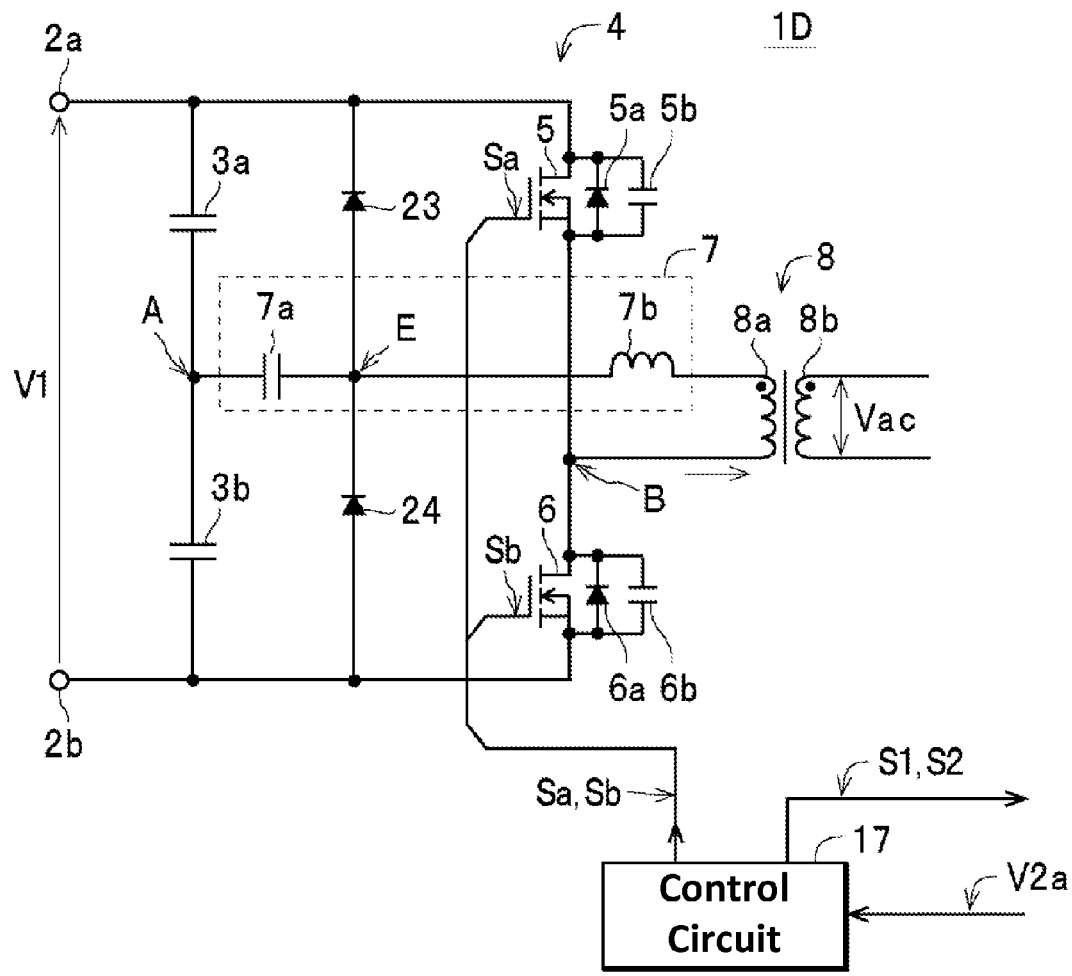
FIG. 9 is a circuit diagram of a primary side of a transformer 8 in a DC-DC converter 1D according to an embodiment of the present invention.

Further, in the above configuration in which the pair of the second switching elements 11 and 12 are operated in the state of overlapping a part of each ON period as explained above, an amplitude of the node E is changed according to a load current. Therefore, there are cases in which the voltage of the node E becomes higher than the voltage of the input terminal 2a and in contrast, in which the voltage of the node E becomes lower than the voltage of the input terminal 2b depending on the load current. In this case, it is not preferred that the first switching elements 5 and 6 may not perform the zero voltage switch operation. Therefore, in a DC-DC converter 1D shown in FIG. 9, configurations in which a diode 23 is connected between the node E and the input terminal 2a and in which a diode 24 is connected between the node E and the input terminal 2b are adopted. According to the DC-DC converter 1D, even when the amplitude of the node E is changed, a clipping is performed to the greatest value by the voltage of the input terminal 2a and the clipping is performed to the minimum value by the voltage of the input terminal 2b. Therefore, it can be realized that the first switching elements 5 and 6 can certainly perform the zero voltage switch operation. Further, a circuit configuration of a secondary side of the transformer 8 in the DC-DC converters 1D is the same as the circuit configuration of the DC-DC converter 1. Therefore, diagrams and an explanation are omitted.

In each of the DC-DC converters 1, 1A, 1B, 1C and 1D, a configuration in which the pair of the rectifying devices 11 and 12 located at the negative electric potential side among the four rectifying devices 9, 10, 11 and 12 corresponds to the second switching element is adopted. However, instead of the configuration as explained above, a configuration in which the pair of the rectifying devices 9 and 10 located at the positive electric potential side corresponds to the second switching elements can also be adopted though it is not shown. Further, in each of the DC-DC converters 1, 1A, 1B, 1C and 1D, another pair of the rectifying devices other than the pair of the rectifying devices that corresponds to the second switching elements among four rectifying devices 9, 10, 11 and 12 are configured with the diodes. However, instead of the configuration as explained above, a configuration in which synchronization rectifying devices are used can also be adopted, though it is not shown. Specifically, the synchronization rectifying device is turned ON during only a period in which an electric current flows in a direction from a source terminal toward a drain terminal.

The current resonance type DC-DC converter and the method for operating a current resonance type DC-DC converter being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A current resonance DC-DC converter, comprising:
   a transformer that has a primary winding and a secondary winding;
   a switching circuit that has a pair of first switching elements and that is connected to the primary winding;
   an AC/DC transfer circuit that:
      has four rectifying devices, which are connected in full bridge and include a pair of second switching elements,
      is connected to the secondary winding,
      converts an AC voltage, which is induced at the secondary winding, into a DC voltage, and
      outputs the DC voltage; and
   a control circuit that is configured to control ON and OFF operations of the pairs of the first and second switching elements, wherein
   the control circuit is configured to control the ON and OFF operations so as to synchronize the pair of the first switching elements with the pair of the second switching elements,
   the control circuit is configured to synchronize one of the first switching elements with one of the second switching elements and to synchronize the other of the first switching elements with the other of the second switching elements, and
   the control circuit is configured to adjust an overlapped ON period where the second switching elements perform the ON operations at the same time in accordance with a voltage value of the DC voltage so as to change the overlapped ON period during which both of the second switching elements perform the ON operations at the same time.

2. The current resonance DC-DC converter according to claim 1, wherein
   the first switching elements are alternatively turned ON and OFF, and
   the switching circuit is configured with a push-pull type circuit or a bridge type circuit.

3. The current resonance DC-DC converter according to claim 1, wherein
   the pair of the second switching elements are provided at a positive potential side or a reference potential side of the four rectifying devices.

4. The current resonance DC-DC converter according to claim 1, wherein
   the control circuit controls the ON and OFF operations of the first switching elements with a predetermined frequency and a predetermined duty ratio.

5. The current resonance DC-DC converter according to claim 2, wherein
   the control circuit controls the ON and OFF operations of the first switching elements with a predetermined frequency and a predetermined duty ratio.

6. The current resonance DC-DC converter according to claim 3, wherein
   the control circuit controls the ON and OFF operations of the first switching elements with a predetermined frequency and a predetermined duty ratio.

7. A method for operating a current resonance DC-DC converter that includes: a transformer that has a primary winding and a secondary winding; a switching circuit that has a pair of first switching elements and that is connected to the primary winding; and an AC/DC transfer circuit that has four rectifying devices, which are connected in full bridge and include a pair of second switching elements, that is connected to the secondary winding, that converts an AC voltage, which is induced at the secondary winding, into a DC voltage and that outputs the DC voltage, the method comprising:
controlling ON and OFF operations of the pairs of the first and second switching elements;
synchronizing the pair of the first switching elements with the pair of the second switching elements;
synchronizing one of the first switching elements with one of the second switching elements and synchronizing the other of the first switching elements with the other of the second switching elements; and
adjusting an overlapped ON period where the second switching elements perform the ON operations at the same time in accordance with a voltage value of the DC voltage so as to change the overlapped ON period during which both of the second switching elements perform the ON operations at the same time.

8. The method for operating a current resonance DC-DC converter according to claim 7, wherein
the first switching elements are alternatively turned ON and OFF, and
the switching circuit is configured with a push-pull type circuit or a bridge type circuit.

9. The method for operating a current resonance DC-DC converter according to claim 7, wherein
the pair of the second switching elements are provided at a positive potential side or a reference potential side of the four rectifying devices.

10. The method for operating a current resonance DC-DC converter according to claim 7, further comprising:
controlling the ON and OFF operations of the first switching elements with a predetermined frequency and a predetermined duty ratio.

11. The method for operating a current resonance DC-DC converter according to claim 8, further comprising:
controlling the ON and OFF operations of the first switching elements with a predetermined frequency and a predetermined duty ratio.

12. The method for operating a current resonance DC-DC converter according to claim 9, further comprising:
controlling the ON and OFF operations of the first switching elements with a predetermined frequency and a predetermined duty ratio.

* * * * *